Feb. 19, 1952  E. C. VAN BLARCOM  2,586,125
APPARATUS FOR TESTING THE CONTINUITY OF FUSES
Filed Sept. 17, 1948

INVENTOR
E.C. VAN BLARCOM
BY
W.C. Parnell
ATTORNEY

Patented Feb. 19, 1952

2,586,125

UNITED STATES PATENT OFFICE 2,586,125

APPARATUS FOR TESTING THE CONTINUITY OF FUSES

Elsworth C. Van Blarcom, Englewood, N. J., assignor to Western Electric Company, Incorporated, New York, N. Y., a corporation of New York Application September 17, 1948, Serial No. 49,722

6 Claims. (Cl. 175—183)

This invention relates to an apparatus for testing the continuity of fuses, and more particularly to apparatus for detecting swinging opens of very short duration in fuses.

Tubular types of fuses employed in the communication art occasionally contain what are commercially called "swinging opens" which may not be detected in commercially known test sets. By the term "swinging opens," it is meant that electrically there is continuity in the fuse, but that a mechanical defect exists therein, which if the fuse is jarred or otherwise roughly handled, will cause an open in the fuse.

Heretofore, test sets have been provided to jar the fuses being tested in an attempt to determine the existence of swinging opens in the fuses, but these test sets have not been sufficiently sensitive to detect an open of very short duration in a fuse under test. As a result, fuses apparently effective contained the mechanical defect of a swinging open which may become an electrical defect when installed in a communication circuit.

An object of the invention is to provide an apparatus for testing the continuity of fuses and which is capable of detecting swinging opens in fuses under test.

With this and other objects in view, the invention comprises an apparatus for testing the continuity of fuses including terminals to removably receive and firmly hold a fuse therebetween, a fast acting gas filled tube, the grid of which is included in a circuit with the terminals and the fuse whereby continuity in the fuse will complete the circuit to cause application of a negative potential on the grid to maintain the tube unoperated. The apparatus further includes an electrically energizable indicating element in an indicating circuit and means rendered effective by discontinuity in the fuse removing the negative potential on the grid to cause the gas filled tube to operate to close the indicating circuit.

In the present embodiment of the invention, the apparatus also includes an agitator operated electrically to repeatedly jar a fuse under test to cause an opening of the circuit through the fuse should there exist in the fuse any mechanical defect which could cause the fuse to open while in use. There is also provided in the apparatus a switch, operated with a good fuse between the terminals, to check the efficiency of the gas tube. A timing unit is associated with the agitator limiting the time of its operation.

Figure 1:
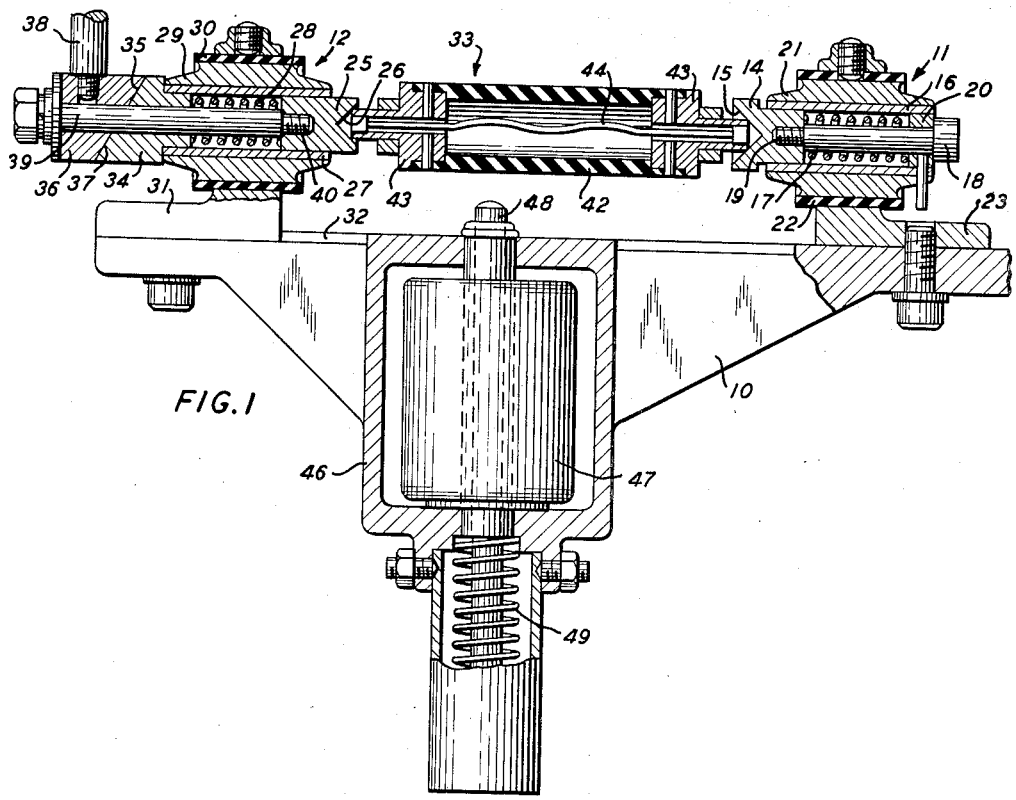
Figure 2:
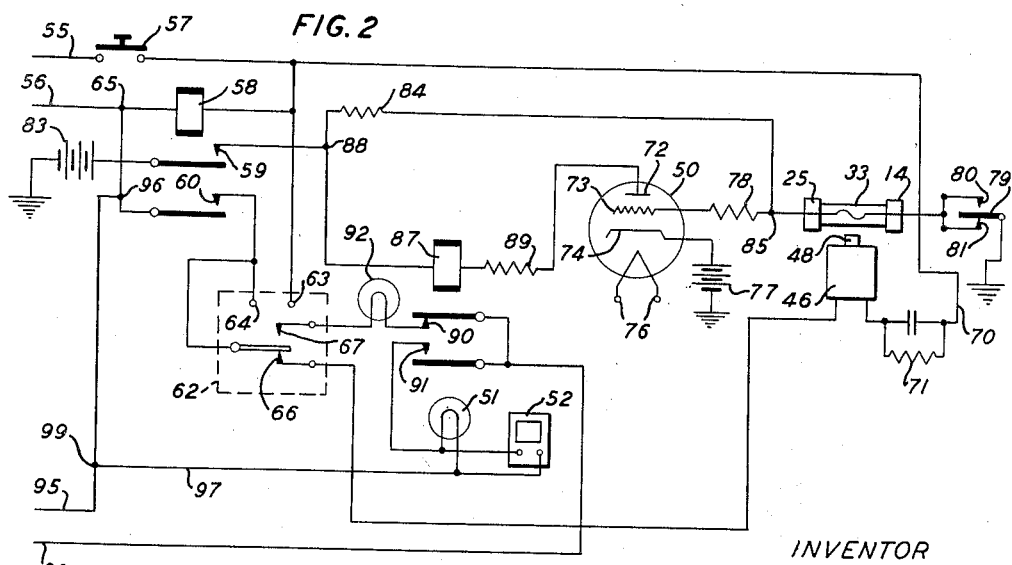

Other objects and advantages will be apparent from the following detailed description when considered in conjunction with the accompanying drawing, wherein Fig. 1 is a vertical sectional view of the apparatus showing a fuse under test being mounted therein; and Fig. 2 is a wiring diagram illustrating the electrical circuits for the apparatus.

Referring now to the drawing, attention is first directed to Fig. 1 which has a supporting frame 10 upon which is mounted a fixed position terminal unit 11 and a movable terminal unit 12. The unit 11 has a terminal 14 of conductive material with a conical recess 15 in the outer end thereof, the terminal being mounted for sliding movement in a sleeve 16 against the force of a spring 17. The spring 17 is disposed concentric with respect to a guide pin 18, the reduced inner end 19 of which is threadedly connected to the terminal 14. A collar 20 fixedly mounted in the opposite end of the sleeve 16 from the terminal serves as an abutment for the spring 17 and is centrally apertured for longitudinal movement of the pin 18. An outer collar 21 concentric with the sleeve 16 supports the sleeve and its terminal mechanism and an insulating sleeve 22 is disposed concentric with the collar 21. All of this mechanism is supported by a bracket 23 mounted at a suitable position on the main supporting frame 10.

The unit 12 is substantially identical to the unit 11, including a terminal 25 with a conical recess 26 slidable in a sleeve 27 against a spring 28. The sleeve 27 is disposed in a collar 29 and the collar in turn is disposed in an insulating sleeve 30 of a bracket 31 which is mounted at any desired adjusted position in a groove 32 of the main supporting frame 10. The difference in structures of the units 11 and 12 lies in the mechanism for moving the terminal 25 manually for supporting a fuse 33 to be tested and freeing the fuse after test. This means includes a collar 34 having one end extending into the sleeve 27 to act as an abutment for the spring 28, the other end having a diagonally positioned surface 35. A cam 36 having a diagonally positioned surface 37 is actuated by a lever 38 and is rotatably mounted on a rod 39 which extends through the collar 34, the spring 28, and has a reduced inner end 40 threadedly connected to the terminal 25.

In the present embodiment of the invention, the fuse to be tested is of the tubular type shown in Fig. 1 having a tubular central portion 42 formed of insulating material and metallic ends 43 forming terminals for the fuse and connections for the fuse wire 44, the continuity of which is to be tested. It will be apparent by viewing Fig. 1 that rotation of the cam 36, one half revolution, will move the terminal 25 to the left a sufficient distance against the force of the spring 28 to allow an operator space to insert a fuse to be tested between the terminals 14 and 25 after which returning the cam to its initial position will allow the springs 28 and 17 to function producing sufficient force on the ends 43 or terminals of the fuse to form satisfactory electrical connections therewith.

An agitator 46 mounted on the supporting frame 10 includes a coil 47 and a core type plunger 48 normally held downwardly by a spring 49, but positioned to strike the fuse 33 under test.

The wiring diagram illustrated in Fig. 2 discloses a fuse 33 schematically, as well as the agitator 46 and its plunger 48. The salient feature of the testing circuit includes a quick acting gas filled tube 50 which will operate as a result of a positive open or an instantaneous swinging open in the fuse caused by the agitator 46 operating during a given interval of time. Indicating elements 51 and 52 will be energized, should there be positive discontinuity in the fuse under test.

The wiring diagram includes lead wires 55 and 56 from a 110 v. A. C. supply. A switch 57 in line 55, when closed, completes a circuit through line 55, switch 57, the winding of a relay 58 and line 56. Energization of the relay 58 closes its make contacts 59 and 60. Closing of the switch 57 also completes a circuit through a timing unit 62, this circuit being traced from line 55, through switch 57, into the timing unit at terminal 63, out of timing unit at terminal 64, through closed contact 60 to line 56 at connection 65. The timing unit 62 is of a commercially known type including a break contact 66, which is held closed during a predetermined interval of time for which the timing unit is set after which a make contact 67 of the unit is closed. The switch 57 is held closed during the entire period of the testing operation for each fuse. A circuit is therefore completed through the switch 57, through condenser 70 and resistance 71, in parallel, through the winding 47 of the agitator 46, through the break contact 66 of the timing unit 62, closed contact 60 and connection 65 to the line 56.

The tube 50 includes a plate 72, a grid 73, a cathode 74, and a heater 75. The heater 75 is provided with a suitable electrical energy, for example, 6.3 v. A. C. applied to terminals 76. The grid 73 is connected to the terminal 25 of the apparatus through a suitable resistance 78 and the terminal 14 of the apparatus is connected through a check switch 79, including contacts 80 and 81, to ground. The cathode 74 is maintained at a suitable potential such as 30 volts above ground by a battery 77 and as a result, the grid 73 is negatively biased to prevent the gas in the tube from breaking down providing there is continuity in the fuse 33 under test.

The contact 59 of relay 58, when closed, connects a suitable source such as a 150 volt grounded battery 83 through contact 59, resistance 84, to connection 85 between the resistance 78 in the grid circuit and the terminal 25. A relay 87, the winding of which is included in a circuit extending from connection 88 through a resistance 89 to the plate 72 of the tube 50 is unoperated as long as there is continuity in the fuse circuit. Discontinuity in the fuse under test resulting from a positive break in the fuse wire or a defect known as a swinging open which will cause the fuse circuit to open while the fuse is being agitated, will disconnect the grid 73 from ground thereby removing the negative biasing potential from the grid. As soon as the bias is removed from the grid, the potential between the plate 72 and the cathode 74 is effective to break down the gas in the tube and this action is expedited by the fact that, with an open fuse, point 85 is no longer maintained at ground potential and positive bias is applied to the grid from the source 83. The tube 50 therefore becomes and remains conducting through resistances 84 and 78 even though the fuse is open for only an extremely short time. The current in the plate circuit including the resistance 89 and the winding of the relay 87 causes the relay to operate, opening its normally closed contact 90 and closing its contact 91. The opening of contact 90 opens the circuit through the indicating lamp 92 and the closing of contact 91 completes a circuit from conductor 94 through the indicating elements (lamp) 51 and (buzzer) 52 in parallel and conductor 97 to conductor 95. If the fuse 33 under test is good, the tube 50 does not fire, the relay 87 remains unoperated and the good condition of the fuse is indicated by the lamp 92 which is lighted after the set time interval over a circuit extending from line 94, through contact 90, lamp 92, contact 67, contact 60 to line 95. If the relay 87 had not operated, resulting from a good fuse 33 under test, a circuit would be completed through an indicating lamp 92 to indicate this condition. This circuit originates with line 94 connected to a 5 v. A. C. alternating current supply and extending through contact 90, lamp or indicating element 92, through contact 67 of the timing unit at the end of the predetermined period of time, through closed contact 60 to line 95 at connection 96.

In preparing the apparatus for operation, the units 11 and 12 are positioned with respect to each other to readily receive fuses 33 of the type to be tested. Prior to inserting a fuse for test in the apparatus, for example, in the beginning of a working day, it is advisable to check the apparatus to determine whether or not the tube 50 and the indicating elements are functioning properly. This may be done readily by inserting a good fuse or an element electrically connecting the terminals 14 and 25 and then operating the check switch 79. The switch 79 is of a commercially known type capable of instantaneous operation causing the same effect resulting from a fuse with a swinging open defect therein. The apparatus is now in readiness for operation. The operator inserts fuses 33 singly between the terminals 14 and 25 to include them in the grid circuit as shown in Fig. 2. The operator next closes the switch 57 which energizes the relay 58, causes energization of the agitator 46 and starts the timing unit 62 to function. If the fuse is satisfactory, the lamp 92 will be energized at the end of the testing interval determined by the timing unit 62. However, if there is discontinuity in the fuse, the negative potential on the grid applied through the cathode 77 is removed allowing the potential through the resistances 84 and 78 to be applied to the grid causing current flow in the plate circuit to energize the relay 87, opening the circuit to the "good" lamp or indicating element 92 and closing the circuits through the "reject" or indicating elements 51 and 52. After the indicating lamp 92 or the indicating elements 51 and 52 operate, the operator knows that the test has been completed and at this time, the switch 57 is allowed to open, after which the apparatus is automatically reset to test the next fuse. The same operation takes place during the testing of each fuse, first the placing of the fuse between the terminals 14 and 25 followed by the closing of the switch 57 and holding the switch closed until the test is completed.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for testing the continuity of fuses, comprising terminals to receive and hold therebetween a fuse to be tested, means for agitating the fuse, a gas tube having a plate, a grid and a cathode, a plate-cathode circuit for the tube including a source of potential tending to cause the tube to conduct, a grid-cathode circuit for the tube including the terminals and a source of bias potential for preventing the tube from conducting, a relay operated when the tube is conducting, a first indicator actuated when the relay is released for indicating continuity through a fuse between the terminals and a second indicator actuated when the relay is operated for indicating a discontinuity in the fuse.

2. Apparatus according to claim 1 in combination with means responsive to a discontinuity in the grid cathode circuit for applying positive potential to the grid to accelerate the breakdown of the tube.

3. Apparatus according to claim 1 in combination with means for agitating a fuse held between the terminals, means for disabling the agitating means, and an operating circuit for the first indicator including contacts closed by the operation of the disabling means.

4. Apparatus according to claim 1 having a switch in the grid-cathode circuit for momentarily opening the circuit for simulating the effect on the apparatus of a defective fuse.

5. Apparatus for testing the continuity of fuses comprising means for agitating fuses to be tested, a timer for disabling the agitating means after a predetermined interval, a gas tube having a plate, a grid and a cathode, a plate-cathode circuit for the tube including a relay operated when the tube is conducting, a grid-cathode circuit including terminals for receiving and holding fuses to be tested and a source of potential for maintaining the tube in non-conducting condition, an open fuse indicator actuated by the operation of the relay, a good fuse indicator and an operating circuit therefor including contacts closed when the relay is not operated and contacts closed by the timer after the predetermined interval.

6. Apparatus for testing the continuity of fuses comprising means for agitating fuses to be tested, a gas tube having a plate, a grid, and a cathode, a plate cathode circuit for the tube including a relay operated when the tube is conducting, a grid-cathode circuit including terminals for receiving and holding fuses to be tested and a source of potential for maintaining the tube in non-conducting condition, means for disabling the agitating means, an open fuse indicator actuated by the operation of the relay, a good fuse indicator and an operating circuit therefor including contacts closed when the relay is not operated and contacts closed by the operation of the disabling means.

ELSWORTH C. VAN BLARCOM.

REFERENCES CITED

The following references are of record in the file of this patent:

UNITED STATES PATENTS

| Number | Name | Date |
|---|---|---|
| 1,882,815 | Haegele et al. | Oct. 18, 1932 |
| 1,967,296 | Dixon et al. | July 24, 1934 |
| 2,124,410 | Cockrell | July 19, 1938 |
| 2,272,239 | Delmhorst | Feb. 10, 1942 |
| 2,304,513 | Stearns | Dec. 8, 1942 |
| 2,462,326 | Manoog et al. | Oct. 22, 1949 |